(12) United States Patent
Niemelä et al.

(10) Patent No.: US 7,979,162 B2
(45) Date of Patent: Jul. 12, 2011

(54) WIRELESS CONTROLLER AND A METHOD FOR WIRELESS CONTROL OF A DEVICE MOUNTED ON A ROBOT

(75) Inventors: Esko Niemelä, Olofström (SE); Pierre Öberg, Västerås (SE); Jimmy Kjellsson, Västerås (SE); Martin Strand, Västerås (SE); Åsa Grönqvist, Skultuna (SE); Seija Tasala, Arboga (SE)

(73) Assignee: ABB Research Ltd., Zürich (CH)

( * ) Notice: Subject to any disclaimer, the term of this patent is extended or adjusted under 35 U.S.C. 154(b) by 1567 days.

(21) Appl. No.: 10/530,517

(22) PCT Filed: Oct. 7, 2003

(86) PCT No.: PCT/SE03/01562
§ 371 (c)(1),
(2), (4) Date: Aug. 26, 2005

(87) PCT Pub. No.: WO2004/030871
PCT Pub. Date: Apr. 15, 2004

(65) Prior Publication Data
US 2006/0122730 A1    Jun. 8, 2006

(30) Foreign Application Priority Data

Oct. 7, 2002 (SE) ...................... 0202956

(51) Int. Cl.
*G05B 15/00* (2006.01)
*G06F 19/00* (2006.01)
(52) U.S. Cl. ... 700/264; 700/213; 700/245; 318/568.11; 414/730; 414/744.3; 901/46

(58) Field of Classification Search .............. 700/253, 700/218, 65, 257; 901/50, 41; 340/815.6
See application file for complete search history.

(56) References Cited

U.S. PATENT DOCUMENTS

| | | | | |
|---|---|---|---|---|
| 4,709,265 | A * | 11/1987 | Silverman et al. | 348/158 |
| 5,395,199 | A * | 3/1995 | Day et al. | 414/267 |
| 5,672,044 | A * | 9/1997 | Lemelson | 414/744.3 |
| 6,232,735 | B1 * | 5/2001 | Baba et al. | 318/567 |
| 6,546,436 | B1 * | 4/2003 | Fainmesser et al. | 710/5 |
| 7,010,294 | B1 * | 3/2006 | Pyotsia et al. | 455/420 |

(Continued)

FOREIGN PATENT DOCUMENTS

DE    90 10 967.8    11/1990
(Continued)

OTHER PUBLICATIONS

Kjellsson, J., "Wireless Tooling Concept," Proceedings of the 33rd ISR (International Symposium on Robotics, Oct. 7-11, 2002.*

(Continued)

*Primary Examiner* — Thomas G Black
*Assistant Examiner* — Lin B Olsen
(74) *Attorney, Agent, or Firm* — Venable LLP; Eric J. Franklin

(57) ABSTRACT

A wireless controller for controlling and/or monitoring a device arranged mounted on or relative to an industrial robot. A wireless communicator including a processor arranged with software means handles wireless communication to and from the device. A control carries out at least one control function for one or more actuators of the device. Also, a method, a computer program and a graphic user interface.

40 Claims, 5 Drawing Sheets

U.S. PATENT DOCUMENTS

| | | | | |
|---|---|---|---|---|
| 7,127,325 B2* | 10/2006 | Nagata et al. | ............ | 700/245 |
| 2002/0035418 A1 | 3/2002 | Lee | | |
| 2002/0111709 A1* | 8/2002 | DiStasio et al. | ............ | 700/213 |
| 2002/0120362 A1* | 8/2002 | Lathan et al. | ............ | 700/245 |
| 2002/0173877 A1* | 11/2002 | Zweig | ............ | 700/245 |
| 2002/0192057 A1* | 12/2002 | Meulen | ............ | 414/217.1 |
| 2003/0060810 A1* | 3/2003 | Syrowicz et al. | ............ | 606/9 |
| 2003/0080874 A1* | 5/2003 | Yumoto et al. | ............ | 340/825.71 |
| 2004/0034448 A1* | 2/2004 | Siegers | ............ | 700/245 |
| 2004/0148058 A1* | 7/2004 | Johannessen et al. | ............ | 700/245 |
| 2005/0052148 A1* | 3/2005 | Carlson et al. | ............ | 318/568.11 |
| 2005/0244260 A1 | 11/2005 | Deplano | | |

FOREIGN PATENT DOCUMENTS

| | | |
|---|---|---|
| DE | 100 49 816 A1 | 5/2001 |
| JP | 60186908 | 9/1985 |
| JP | 07-318142 | 12/1995 |
| JP | 10-046631 | 2/1998 |
| JP | 10-128538 | 5/1998 |
| JP | 2000-099143 | 4/2000 |
| WO | WO 02/078915 A1 | 10/2002 |

OTHER PUBLICATIONS

Communication Pursuant to Article 96(2)EPC from the European Patent Office issued on Jul. 26, 2007, in connection with counterpart European Application No. 03 748 854.1-1239.

Kjellsson, J., "Wireless Tooling Concept," *Proceedings of the 33rd ISR (International Symposium on Robotics*, Oct. 7-11, 2002.

* cited by examiner

WIRELESS CONTROLLER AND A METHOD FOR WIRELESS CONTROL OF A DEVICE MOUNTED ON A ROBOT

TECHNICAL FIELD

The present invention is concerned with an apparatus for wireless control of a device. In particular it is concerned with a wireless controller for a device or tool mounted on or otherwise used in conjunction with an industrial robot.

BACKGROUND ART

Industrial robots are used for many tasks. Common uses for industrial robots include operations for painting, welding and placing components. A robot carrying out a welding operation may for example be a general purpose industrial robot with a welding tool, such as an arc welding tool, mounted on the end of the robot arm. Generally such a tool is mounted on a robot arm using some form of swivel joint. The robot and/or robot arm is equipped with cables to communicate control signals from the control unit of the robot to the tooling attached to the robot arm, and the cables are arranged across the swivel joint. The communication requirement between a robot control unit and a tool may vary. Communications may include control signals for the tool and/or collection of data from the tool as well as data from actuators and/or sensors arranged on or near the tool. The requirements for the swivel joint may also be extensive in order to allow for rotation through 360° and also maintain reliable functioning in difficult or hostile industrial environments.

However the cabling to the tool on the end of the robot arm is subject to stress due to the repeated movements of the arm under production cycles, leading to maintenance and replacement interventions since the cables are subject to continuous wear and tear. Cables may also be damaged during industrial operations such as welding.

SUMMARY OF THE INVENTION

The aim of the present invention is to remedy one or more of the above mentioned problems. This and other aims are obtained by a device. In a first aspect of the invention a wireless controller is provided for controlling and/or monitoring a device arranged relative an industrial robot, the wireless controller comprising wireless communication means including a processor arranged with communication functions means for handling wireless communication to and from said device and control means for carrying out at least one control function for one or more actuators of said device.

In another aspect of the invention a method is described for using the wireless controller to control and/or monitor a device arranged relative an industrial robot In an embodiment of the invention a configurable hardware I/O interface is integrated with the wireless controller. In another embodiment a diagnostic means is provided for processing operational data and providing to a display means diagnostic information. In a further embodiment a separate processor is provided to process operational data and provide diagnostic information.

The major advantage of the wireless controller for tooling and other devices is the elimination of the communication cables between the central or supervisory robot control cabinet and the device arranged after the swivel joint, which cables are no longer needed. This not only leads to reduced cost but also eliminates the need for maintenance and replacement for the traditional cables which are subject to continuous wear. Another advantage of the wireless controller is that it provides a two-way wireless communication capacity that makes it suitable to replace cabling for an extremely wide range of robot applications and production process applications. Another and important advantage is that the communication capacity is combined with a local control and monitoring functionality which provides a local or distributed control functionality remote from the usual central control unit. This in turn provides new opportunities to carry out certain control, monitoring, maintenance and/or configuration tasks in a more effective way by arranging them as local or distributed control functions instead of functions accessible only via a central control unit. Furthermore the complexity of the swivel can be significantly reduced since there no longer is a requirement to attach or carry control cables. This ultimately leads to lower weight and reduced cost for the swivel. The degree of flexibility which comes with the wireless controller for tooling has a great potential for other improvements in production environments. For example, if a device or tooling node is replaced, the new tooling can be connected to the robot within seconds. The invention may also advantageously be used to transfer data for configuration and/or calibration from one tool to the next before the device is finally arranged on the robot, thus speeding up tool changes.

In another aspect of the invention a computer program is a described for carrying out the method according to the invention. In another aspect of the invention a computer program product comprising a computer program for carrying out the method of the invention is described. In another aspect of the invention a computer data signal embodied in a carrier wave is described. In another, further aspect of the invention a graphical user interface is described for displaying control and/or operational and/or maintenance data for the device controlled by the wireless controller.

BRIEF DESCRIPTION OF THE DRAWINGS

A more complete understanding of the method and system of the present invention may be had by reference to the following detailed description when taken in conjunction with the accompanying drawings wherein.

DESCRIPTION OF THE PREFERRED EMBODIMENTS

Figure 1:
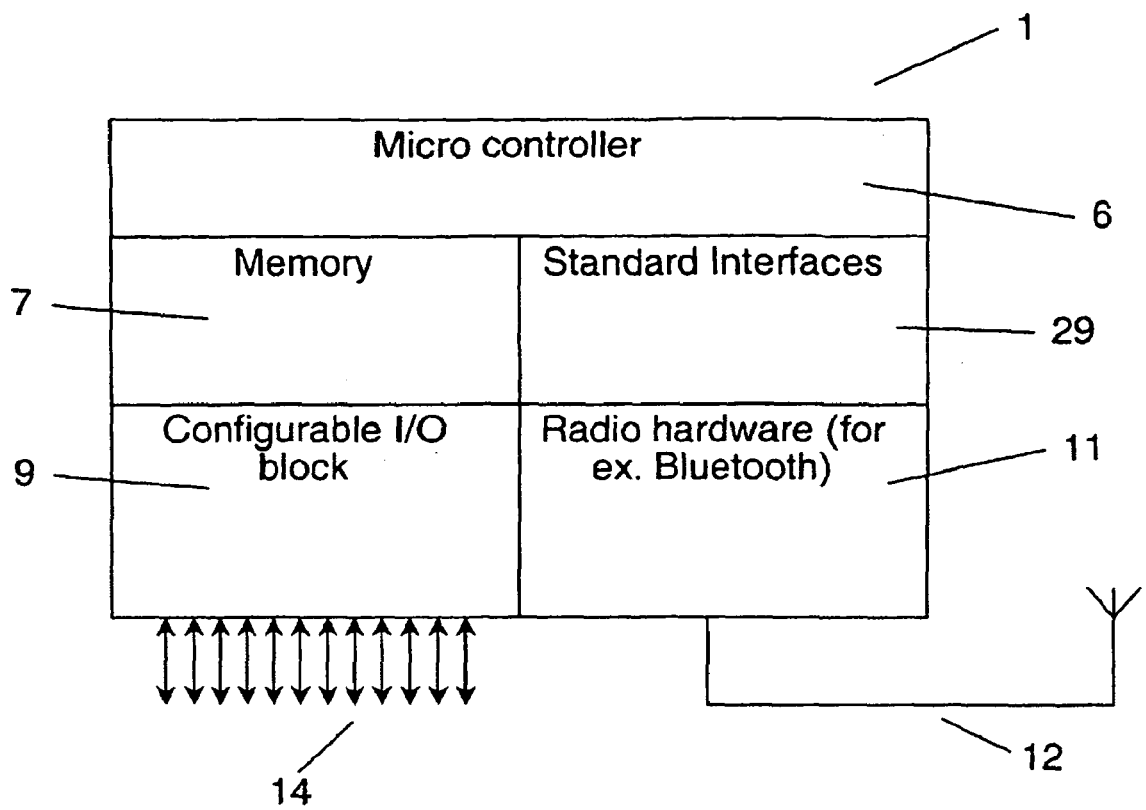
FIG. 1 shows in a schematic block diagram for a hardware configuration for a wireless controller according to an embodiment of the invention.
Figure 2:
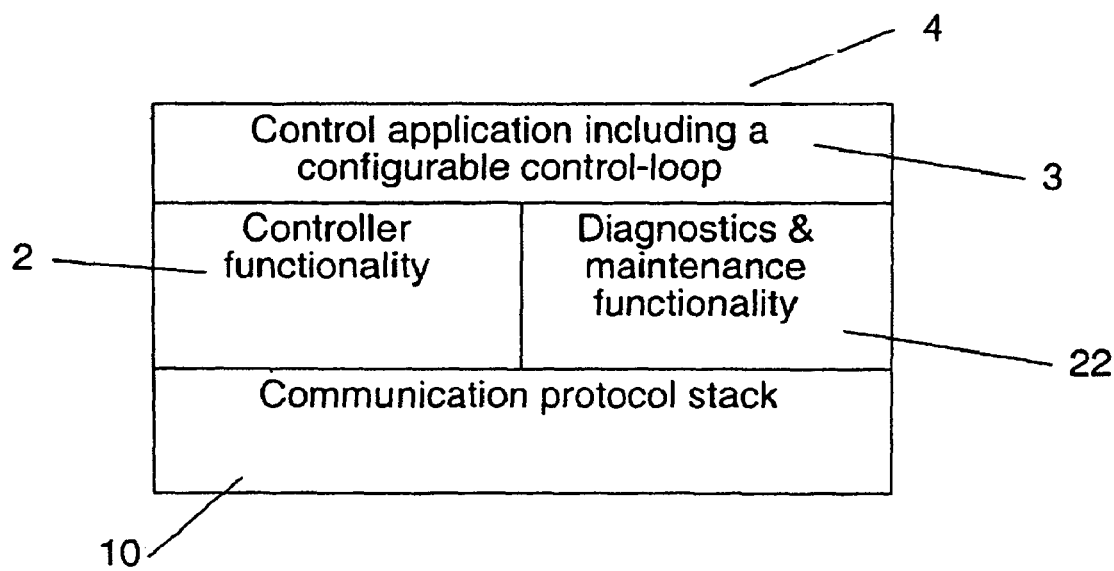
FIG. 2 shows in a schematic block diagram for a software configuration for a wireless controller according to an embodiment of the invention.

FIG. 1 presents a schematic diagram of a hardware configuration for a wireless controller for controlling and/or monitoring a device mounted on, or otherwise arranged relative to, an industrial robot according to an embodiment of the invention. FIG. 1 shows schematically a wireless controller 1 comprising a radio antennae 12, radio receiver/transmitter hardware 11, processor 6, memory means 7, standard interfaces 29, and a configurable hardware I/O interface 9. The standard interfaces 29 may comprise any data interface to a processor, such as a serial interface. The configurable hardware I/O interface 9 may accept input to the wireless controller 1 and/or send output signals from the wireless controller as indicated by the arrows with numeral 14. FIG. 2 shows schematically a software configuration 4 for the wireless controller 1 comprising software means including application programs comprising a configurable control loop 3, a controller functionality module 2 and radio communication functions such as a communication protocol stack 10. Also shown is a diagnostics and maintenance functionality 22.

Figure 3:
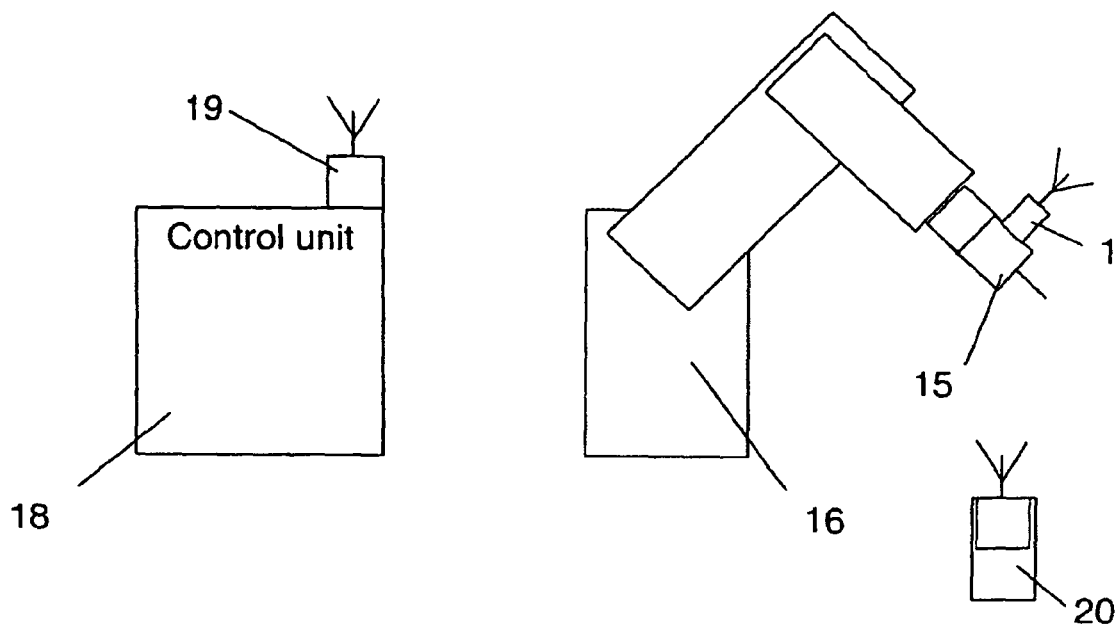
FIG. 3 shows schematically a simplified layout for an industrial robot, a supervisory control unit and a wireless controller.

FIG. 3 shows a simplified layout comprising a wireless controller to control and/or monitor a device arranged with an industrial robot. FIG. 3 shows an industrial robot 16 connected by wireless means 19, 1 to a central or other supervisory control unit 18. The robot has a device arranged on it, in this case a welding tool 15 mounted on the robot arm. The welding tool has a wireless controller 1 attached to it or otherwise arranged close by. A wireless node 19 is arranged connected to the supervisory robot control unit 18. The supervisory control unit 18 is further arranged with wireless communications means 19. A portable computing device 20 equipped for wireless communication is depicted so as to be within radio communication range of the devices in the layout.

In respect of FIGS. 1 and 2 there are six main building blocks (comprised as hardware and software) which comprise the wireless controller:
Processor (or micro-controller) & Memory 6, 7,
Radio transmitter/receiver hardware 11,
Communication protocol stacks 10,
Control functions application program 3
Controller functionality 2
Configurable HW interface for configuration of different I/O interfaces 9.

These blocks form a complete system which can run both autonomously and/or as connected to a high level control system for a robot or a production cell or other production process. The system is capable of interconnection with a very large variety of other components/systems due to the configurable HW I/O block in which an arbitrary interface can be implemented. This includes configuration of each channel of the hardware interface 9 as either input or output, which may be digital or analogue and for compatibility with various bus and/or fieldbus standards. The configurable HW I/O block may also be used for implementation of mathematical algorithms etc.

The wireless controller is comprised as a substantially single circuit. In practice this may be produced, for example, as an integrated circuit with all the components on one board, or an encapsulated circuit containing all described blocks, and hence implementing the full functionality of the described invention. The encapsulation may comprise several interconnected silicon-based components (Radio, programmable HW, CPU and memory).

The invention may be embodied as a combination of a Bluetooth unit commercially available from Ericsson consisting of a Bluetooth radio receiver/transmitter module with an embedded processor or, alternatively, by using a stand-alone microprocessor such as an ARM7, together with a flash memory of say, 2 MByte and RAM of say 2 Mbyte connected to a hardware I/O interface which preferably is programmable for different I/O configurations.

Figure 4:
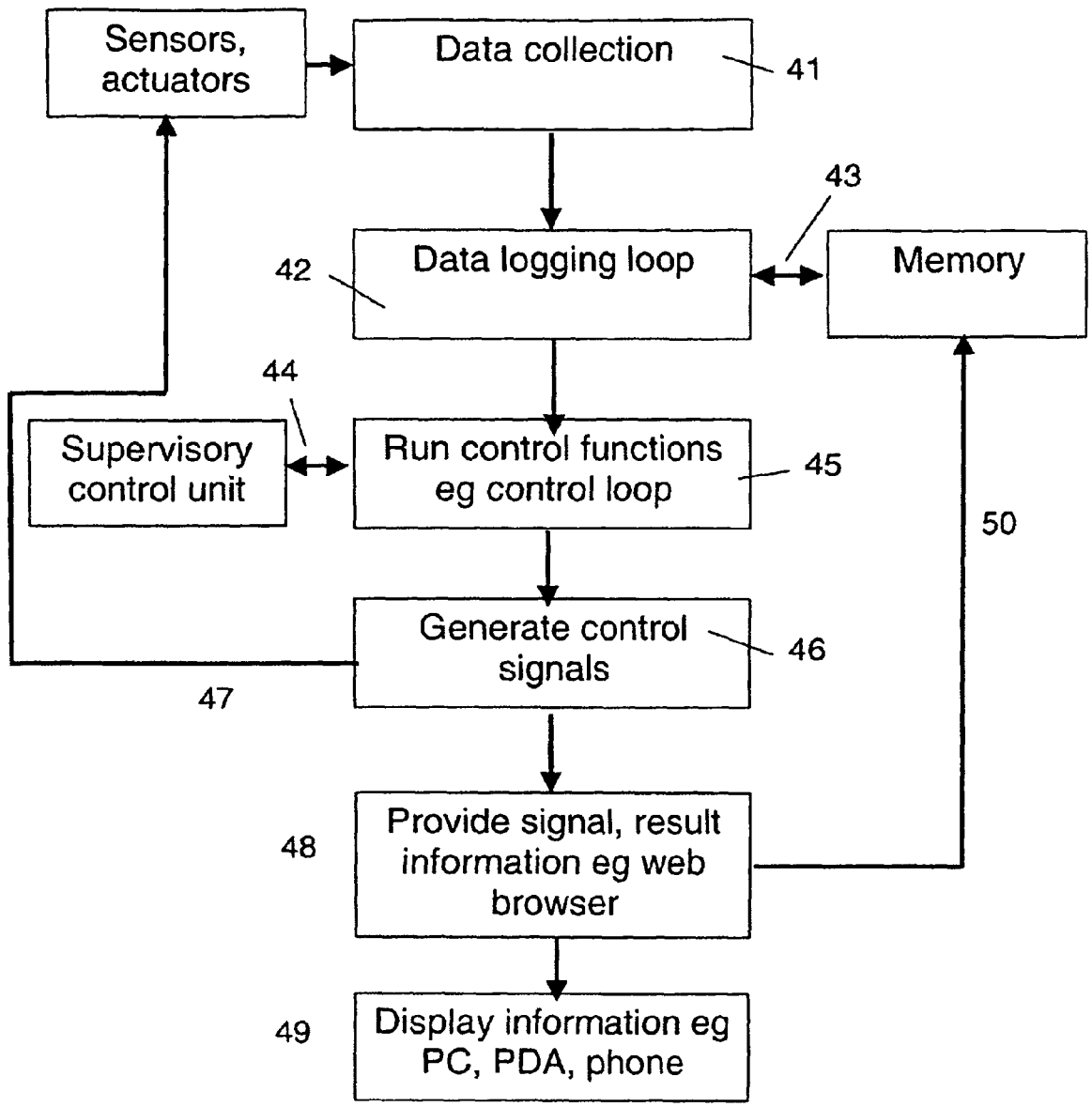
FIG. 4 shows a flowchart for a method for control of a device arranged with an industrial robot using a wireless controller according to an embodiment of the invention.

FIG. 4 shows a flowchart comprising steps of a method according to an embodiment of the invention. Data is collected step 41 from sensors and/or actuators arranged with the device 15, logged in step 42, and stored in, and/or retrieved from memory, in step 43. The supervisory or central robot control unit 18 sends signals wirelessly (step 44) to the wireless controller 1. Control functions are carried out, step 45, dependent on instructions received and data logged and control signals are generated, step 46. Control signals are sent in step 47 to the actuators of the device as necessary. The data is processed in step 48 to make operational data, results and other data available, for example adapted for use with a web client. The processed data may be stored in memory at step 50 for later retrieval. In step 49 the operational data is displayed on another device, communicated preferably by wireless means.

The operation of the wireless controller is basically as follows for a device mounted on or arranged in conjunction to operate with an industrial robot:
the supervisory robot control unit 18 sends a wireless signal 44 via wireless connection means 19 to operate the device 15 mounted on the arm of the robot 16,
the wireless signal is received via antennae 12, processed in the radio hardware 11, passed to the communication protocol stacks 10 running in processor 6,
processed and passed by the communication protocol stacks 10 running in processor 6 to an application program 3 as appropriate, and by
the signal is processed by the application program 3 which generates control and other signals as required 46 and sent 47 via one or more output channels of the configurable hardware I/O interface 9,
the output signal from the wireless controller is received via a wire or data bus at an input node on the device 15,
the input signal to the device causes one or more actuators of the device to operate.

The wireless connection 19 on the robot control system side may be achieved using a wireless module such as a Bluetooth unit together with a Profibus slave. For example a Profibus-slave such as a Wago 750-833 configured with a RS232 module. The Profibus coupler transmits data to the Bluetooth block as soon as any changes on the incoming Profibus data occurs. It is of vital importance that radio transmission quality and integrity is maintained so that the robot operations are always under control. This may be carried out in many known ways. One known method to monitor transmissions is to use a "watchdog" routine or application. A simple watchdog may for example monitor the transmissions sent out. If there has been no changes for 50 ms data will be transmitted anyway. This is done so that the control functionality in the sub-system of wireless controller of the device 15 mounted on the robot arm, and/or the supervisory control unit 18, knows that the radio link is functional.

At the device end the signals from the wireless controller output through the programmable hardware I/O interface 9 to the input node of the device may be achieved using any industrial standard such as a fieldbus protocol such as Modbus, Profibus, Foundation Fieldbus or another data standard such as serial RS232.

In another embodiment of the invention a diagnostic functionality 22 is provided by means of additional computer programs executable preferably in the processor 6. Thus the control application program or programs 3 of FIG. 2 or another software module may comprise one or more executable programs so that as well causing control and/or monitoring functions to be processed, operational data for the device may be stored in the memory hardware 7, and processed using diagnostic software in the processor 6. This information is preferably stored in the wireless controller processor memory 7 and may be accessed at any time via suitable wireless means. The diagnostic information is then available to the robot control unit, or any other compatible wireless-equipped computing device 20, such as a wireless PDA or portable PC, or a telephone suitably equipped with a compatible wireless capability. For example a Bluetooth enabled PDA or PC or other portable computing device within wireless range, for example 10 metres.

Figure 5:
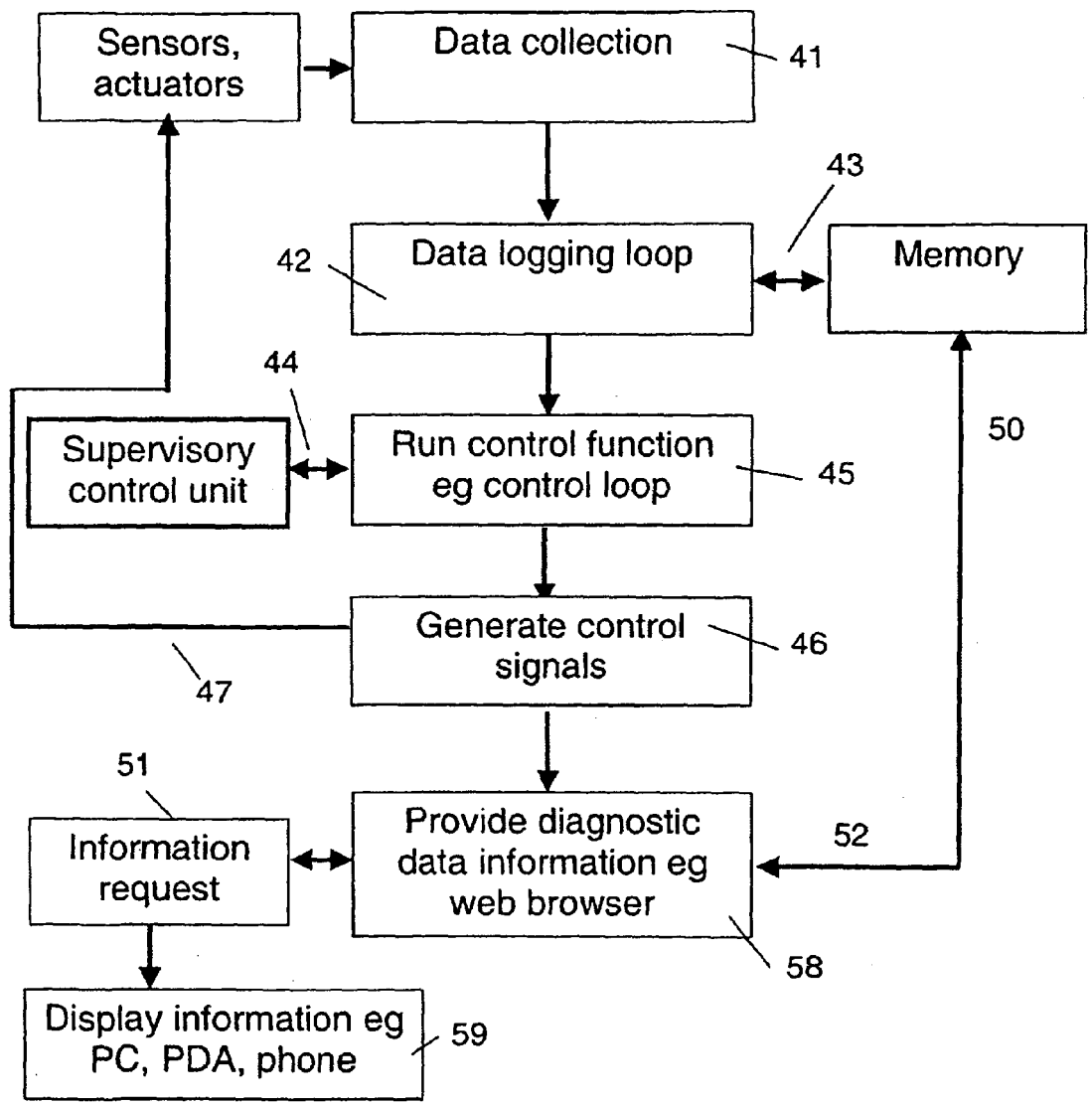
FIG. 5 shows a flowchart for a method for providing operational data and diagnostic information according to another embodiment of the invention.

FIG. 5 shows a flowchart for a method for providing maintenance information by means of the wireless controller based on operational data handled by the wireless controller. A request for information step 51 received by the wireless controller is processed in step 58. The data is retrieved from memory as necessary step 52, processed, and made available for display and use, step 59. The processed operational data, or part of it, may also be stored in memory, step 50. The wireless controller provides the information preferably adapted for a thin client application, such as a web client or other web browser type of application.

This is especially advantageous for carrying out maintenance, repair or configuration tasks without requiring access to the central or other supervisory control system of the robot. The operational information, or a diagnostics analysis based on the operations data may be handled in a portable wireless device or PDA without using special software. For example a standard web-browser may be used and the operational data and/or diagnostics information may be provided in a web-browser compatible format such as extensible Markup Language (XML), HyperText Markup Language (HTML), or a version of a browser-compatible format further adapted for wireless transmission such as Wireless Application Protocol (WAP), Wireless Markup Language (WML), WAP binary protocol (WBXML) other graphic modes such as I-Mode compatible, or similar. In addition or instead, a browser that handles JAVA (Trade Mark) applets, or other Java-related applets coded with J2ME (Java 2 Micro Edition™) or similar executable computer programs, which may be either client side and/or server side, may be used. The presentation of the operation data or diagnostics information based on the data may for example be provided graphically via a XML document or JAVA applet which presents for example current and/or stored duty cycle duration times via a graphical user interface of a portable device.

Figure 6:
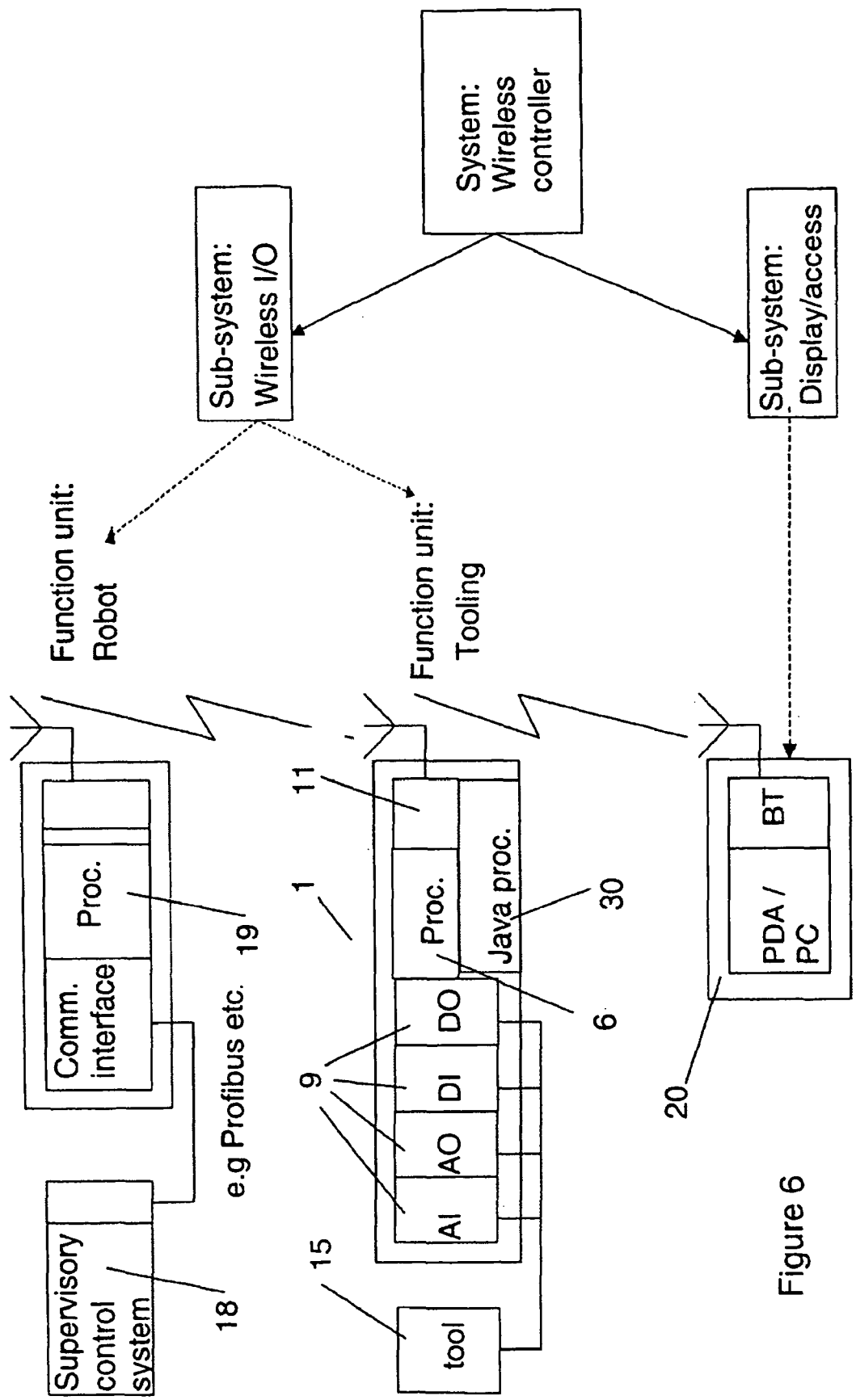
FIG. 6 shows another further embodiment in which a system comprising the wireless controller is arranged with a separate processor module to handle diagnostic information.

In another, further development of the embodiment an additional processor 30 may be used to provide processing power for the diagnostic functions. The hardware used for the diagnostics functionality for the device node mounted on the robot arm may be integrated in the wireless controller of FIG. 1 or alternatively for example a separate JAVA processor card together with a Bluetooth circuit. Such a system is shown in FIG. 6. FIG. 6 shows the wireless controller 1, comprising the processor 6, connected to the sensors and actuators of the tool or device 15 by means of four channels of the configurable hardware interface 9, configured in this example as Analogue In (AI), Analogue Out (AO), Digital in (DI), Digital out (DO). The wireless controller is in radio-communication with a supervisory control system of a robot 18 equipped with a wireless communication node or device 19. A separate system 30 is shown which comprises in this exemplary form a Java processor and functionality for processing and providing maintenance data. A portable wireless device, 20, for example a PDA, a PC or a phone may be arranged within wireless range of the wireless controller 1 with display means to display operational information and maintenance information provided, in this embodiment, by the separate processor 30.

As the system layout in FIG. 6 shows, the wireless controller is arranged with a subsystem used for calculating and presenting diagnostics of the tooling functionality. A diagnostics functionality for the example shown may for example continuously measure and store the elapsed time, thus the duty cycle duration, between the closing of, for example, a magnetic valve or other actuator and confirmation received from one or more sensors. This information is stored in this embodiment either in the wireless controller processor memory (shown as processor 6 and memory 7 in FIG. 1) or in the additional processor (FIG. 6, 30) and may be accessed at any time via suitable wireless means.

Any wireless protocol capable of providing reliable transmissions in an industrial environment may be used, including standards or protocols such as Bluetooth, Wireless LAN (WLAN). For the communication there may be further requirements imposed by the fieldbusses or other parts of the control system. For example there may be a requirement in respect of defining maximum permissible latency (e.g. the time from an I/O changes on e.g. Profibus till the actual I/O value changes on the tooling node).

In a preferred embodiment of the invention the communication technology used is based on the Bluetooth system. There are several aspects which make Bluetooth an advantageous technology. The fact that the range of a class 2 Bluetooth device is limited to around 10 meters is advantageous in robot applications since the physical size of a robot cell often does not exceed a radius of 10 m. It is advantageous to be able to have a large number of robot cells using wireless tooling within the same area of production area in a factory or process plant and that means that it is very important to keep the radio interference levels as low as possible.

The application program 3 or programs run in the processor 6 as well as a communication protocol stack 10, which handles the radio functionality, eg a Bluetooth stack, as well as a control function 2. The communication protocol stack 10 takes care of the data communication towards the Bluetooth module in the wireless controller and the external programmable hardware I/O interface. The control functionality programs 2 and the application programs 3 and the diagnostic functions 22 may each be assigned a different priority for processing in the processor 6. Priority may be assigned in the software, in the programming of those programs, may also be adjusted by means of data downloaded at another point in time, and/or may be adapted by a means hard-coded in the processor hardware.

Quality and security of transmissions may be monitored and assured by means of a watchdog routine as noted above. For example, a routine in the control block may keep track of time since the last data packet was received on the radio channel, and if a certain time (e.g. 200 ms) is exceeded a "problem" flag is transmitted via the programmable hardware I/O interface to the peripheral equipment (i.e. the tooling or device 15 or a Profibus slave). If there still has not been any data transmissions received within a specified time frame a "failure" flag is sent to the peripheral equipment stating that the radio link is no longer functional. For example, from within the normal stacks and protocols customarily available for use with Bluetooth the RFCOMM layer and DM1 packages may be chosen for transmitting data across the radio link. The choice of RFCOM (basically an emulated serial transmission line) makes it very easy to handle serial data coming from the peripheral devices. The DM1 package is the smallest package available in the Bluetooth standard and hence the fastest to transmit, and still capable of handling 17 bytes of user data. More detailed information about Bluetooth in general and the Bluetooth standard version 1.1 of Feb. 22, 2001 may be found at the website of the Bluetooth SIG (Special Interest Group) which has a www address with the name Bluetooth and domain type (suffix) org.

A typical configuration for the T/O interface suitable in the case of digital communication with the tooling side, device 15, may for example consist of 16 DI (Digital Input) and 16 DO (Digital Output) channels, which in the simple case cited above controls a magnetic valve and reads 7 sensors. The I/O:s may be industrial standard 24V using 4 ms filtering on the input side configured to communicate using standard RS232 or a standard Modular bus or another backplane bus. Aside from the regular DO:s there may also be additional visual (LED) quality indication of the radio-link status.

In another and preferred embodiment a high level control language is used. As described, processor 6 of the wireless controller processes signals and information in the communication protocol stacks 10 necessary for the wireless transmission/reception as well as running application software 3 for monitoring and/or control of the device. In order to reduce the total processing power required for wireless communication and control functions, a software control application may be used which requires a reduced amount of wireless communication. This is achieved by including in application program 3 a software control application that comprises a control loop which communicates with a high level control system comprised in the supervisory robot control unit. The high level control system in the robot control unit only has to send specific commands across the radio interface to the device, such as "open", "close" and so on. The high level control loop in the control application running in the wireless controller replies across the radio interface after the operation has been carried out with a message such as "success", "failure" etc.

The wireless controller 1 may also be used to configure a second device and/or second wireless controller arranged in the vicinity of the robot, but not mounted on the robot. Data is downloaded wirelessly from the first wireless controller mounted on the robot to a second device and/or wireless controller within radio range. In this way, a second device and/or a second wireless controller may be speedily configured for use with the robot. To speed up a change of tool or device mounted on a robot, the second device and/or controller may be configured and tested before mounting on the robot. In this way, the downtime for device changeover is minimised.

In another preferred embodiment, the wireless controller is comprised as a system on a single chip, an Application Specific Integrated Circuit (ASIC) including all described blocks (CPU or processor or microprocessor 6, memory 7, configurable hardware I/O interface 9 and radio hardware 11). The ASIC solution with all blocks realized on the same silicon surface provide a high level of flexibility combined with the fast and efficient application execution due to the high integration level.

The wireless controller 1 may be used to control and monitor a device 15 mounted on or arranged to operate in conjunction with an industrial robot. It may be applied to operations such as welding, painting, spray painting, gluing and to control over operations performed by a robot in metal processing processes such as continuous casting, casting, diecasting and production methods for other materials such as plastic injection moulding, compression and/or reaction moulding or extrusion. It may also be used to control other devices, grippers, manipulators and so on that carry out manipulation tasks such as placing, pick and place, and packing of components or subcomponents.

The microprocessor (or processors) of the wireless controller comprises a central processing unit CPU performing the steps of the method according to an aspect of the invention. This is performed with the aid of one or more computer programs, which are stored at least in part in memory accessible by the processor. It is to be understood that the computer programs may also be run on one or more general purpose industrial microprocessors or computers instead of a specially adapted computer.

The computer program comprises computer program code elements or software code portions that make the computer perform the method using equations, algorithms, data and calculations previously described. A part of the program may be stored in a processor as above, but also in a ROM, RAM, PROM or EPROM chip or similar memory means. The program in part or in whole may also be stored on, or in, other suitable computer readable medium such as a magnetic disk, CD-ROM or DVD disk, hard disk, magneto-optical memory storage means, in volatile memory, in flash memory, as firmware, or stored on a data server.

The computer programs described may also be arranged in part as a distributed application capable of running on several different computers or computer systems at more or less the same time.

The invention claimed is:

1. A wireless controller for at least one of controlling or monitoring a tool operatively connected to an industrial robot, the controller comprising:
   a wireless communication module operatively connected to the tool and comprising a processor having a communication function module configured to handle wireless communication to and from said tool, and a control unit configured to carry out at least one control function for one or more actuators of said tool;
   a configurable hardware input/output interface;
   a graphical user interface for carrying out at least one of controlling or monitoring the tool, the interface comprising a display of operational data of the tool provided by the wireless controller, wherein the operational data values displayed are combined with a graphical representation of a relevant production cell or part thereof; and
   a supervisory controller physically separate from the industrial robot and configured to wirelessly send signals to the wireless communication module to control operation of the tool.

2. The wireless controller according to claim 1, wherein the control unit comprises at least one computer program executable by said processor configured to handle the wireless communication.

3. The wireless controller according to claim 1, wherein the control unit configured is further to process a signal from at least one sensor operatively connected to the tool.

4. The wireless controller according to claim 1, wherein the hardware input/output interface is integrated in one unit with said processor.

5. The wireless controller according to claim 1, wherein the control unit further comprises a program configured to carry out at least one of receiving or storing operational data of said tool.

6. The wireless controller according to claim 5, further comprising:
   an additional processor configured to carry out at least one of receiving and storing operational data of said tool.

7. The wireless controller according to claim 5, further comprising:
a memory configured to store operational data.

8. The wireless controller according to claim 5, wherein the control unit further comprises a computer program configured to process the operational data of said tool.

9. The wireless controller according to claim 5, wherein the control unit further comprises an output configured to communicate data dependent on the stored operational data to a display.

10. The wireless controller according to claim 9, wherein the output of the control unit is configured to communicate the stored operational data via the wireless communication module.

11. The wireless controller according to claim 9, wherein the output of the control unit is configured to communicate with a supervisory robot control system using a message sent via any of the list of: SMS, a web address, a phone, a second robot control unit.

12. The wireless controller according to claim 9, wherein the output of the control unit is configured to send a communication to a human operator via any of a list of: SMS, a web address, a network address, a phone, a control unit.

13. The wireless controller according to claim 5, wherein the output configured to communicate the stored operational data comprises an embedded web server.

14. The wireless controller according to claim 1, wherein the control unit further comprises a control loop configured to receive an input signal from a high level control system and to generate a control signal to said tool dependent on the input signal from the high level control system.

15. The wireless controller according to claim 14, wherein input/output signals of the control loop of the control unit are compatible with a high level language.

16. The wireless controller according to claim 1, wherein the wireless communication module is configured to operate compatible with a standard issued by the Bluetooth SIG Inc.

17. The wireless controller according to claim 16, wherein the wireless communication module comprises protocol stack handling for both incoming and outgoing communications.

18. The wireless controller according to claim 16, wherein wireless communication is transmitted according to a protocol that emulates a serial transmission line.

19. The wireless controller according to claim 1, further comprising:
a wireless input/output module configured to provide wireless I/O functions between the supervisory controller and said tool, wherein the wireless input/output module is arranged on or in relative proximity to the industrial robot.

20. A method for wireless at least one of control or monitoring of a tool operatively connected to an industrial robot, the method comprising:
configuring a configurable hardware input/output interface of a wireless controller,
carrying out at least one of controlling or monitoring the tool utilizing a graphical user interface, the interface comprising a display of operational data of the tool provided by the wireless controller, wherein the operational data values displayed are combined with a graphical representation of a relevant production cell or part thereof,
sending a wireless signal from a supervisory controller physically separate from the industrial robot to a wireless communication module of the wireless controller operatively connected to said tool to control operation of the tool,
handling wireless communication to and from the tool with a communication function module of a processor of the wireless communication module,
carrying out at least one control function for one or more actuators of said tool with a control unit of the wireless communication module,
receiving the signal with the wireless communication module,
processing the wireless signal in a processor of a control unit operatively connected to the wireless communication module, and
generating a second control signal in the processor and sending the second control signal to said tool.

21. The method according to claim 20, further comprising sending the second control signal with a hardware input/output interface of the wireless controller.

22. The method according to claim 20, further comprising storing operational data for said tool in a memory of the wireless controller.

23. The method according to claim 20, further comprising storing an in-signal and a result signal sent out in a memory of the wireless controller.

24. The method according to claim 20, further comprising processing operational data and providing, for a web client or a thin client, data comprising any from the list of: signals, results, number of complete cycles, cycle time, statistical information, alarms.

25. The method according to claim 20, further comprising providing operational data for a display.

26. The method according to claim 20, further comprising providing diagnostic information based on an operational data.

27. The method according to claim 26, further comprising:
providing the diagnostic information arranged compatible with a web client or a thin client.

28. The method according to claim 27, further comprising:
providing the diagnostic information arranged compatible with a web browser or telephone adapted web browser format including from the list of: XML, HTML, WML, WBXML.

29. The method according to claim 26, further comprising:
providing the diagnostic information arranged compatible with a Java applet.

30. The method according to claim 20, further comprising:
downloading operational information and/or configuration data stored in the wireless controller to at least one of a second wireless controller or a second tool neither of which are mounted on the robot.

31. The method according to claim 20, further comprising:
providing wireless input/output functions between the robot control system and the tool arranged on or in relative proximity to the industrial robot.

32. The method according to claim 20, wherein the method carries out at least one of controlling and monitoring a tool arranged with an industrial robot to carry out the operation of any one from the list of: welding, soldering, riveting, painting, gluing, folding plate, bending plate, hemming plate, gripping an object, manipulating an object.

33. The method according to claim 20, wherein the method carries out at least one of configuring and calibrating a second wireless controller and/or a second tool prior to use with a robot.

34. The method according to claim 20, wherein the wireless controller is operated by a human operator to carry out at least one of controlling and monitoring the tool.

35. The method according to claim 20, wherein the wireless controller comprises a process running on one or more computers to carry out at least one of supervising and controlling the tool.

36. A computer program product, comprising:
a non-transitory computer readable medium; and
at least one of computer code or software code portions recorded on the computer readable medium for making a computer or processor perform a method for wireless at least one of control or monitoring of a tool operatively connected to an industrial robot, the method comprising
configuring a configurable hardware input/output interface of a wireless controller,
carrying out at least one of controlling or monitoring the tool utilizing a graphical user interface, the interface comprising a display of operational data of the tool provided by the wireless controller, wherein the operational data values displayed are combined with a graphical representation of a relevant production cell or part thereof,
sending a wireless signal from a supervisory controller physically separate from the industrial robot to a wireless communication module of the wireless controller operatively connected to said tool to control operation of the tool,
handling wireless communication to and from the tool with a communication function module of a processor of the wireless communication module,
carrying out at least one control function for one or more actuators of said tool with a control unit of the wireless communication module,
receiving the signal with the wireless communication module,
processing the wireless signal in a processor of a control unit operatively connected to the wireless communication module, and
generating a second control signal in the processor and sending the second control signal to said tool.

37. A graphical user interface for carrying out at least one of controlling or monitoring a tool operatively connected to an industrial robot, comprising:
a display of operational data of the tool provided by a wireless controller comprising a wireless communication module operatively connected to the tool and comprising a processor having a communication function module configured to handle wireless communication to and from said tool, and a control unit configured to carry out at least one control function for one or more actuators of said tool, and a supervisory controller physically separate from the industrial robot and configured to wirelessly send signals to the wireless communication module to control operation of the tool, wherein the operational data values displayed are combined with a graphical representation of a relevant production cell or part thereof.

38. The graphical user interface according to claim 37, wherein the operational data values are provided by an embedded web server comprised in the control of the wireless controller.

39. A wireless controller for carrying out at least one of controlling or monitoring a tool operatively connected to an industrial robot, the wireless controller comprising:
a wireless communication module operatively connected to the tool and including a processor comprising communication function software configured to handle a wireless protocol stack for communication to and from said tool,
a configurable hardware input/output interface,
a graphical user interface for carrying out at least one of controlling or monitoring the tool, the interface comprising a display of operational data of the tool provided by the wireless controller, wherein the operational data values displayed are combined with a graphical representation of a relevant production cell or part thereof, and
a control unit configured to carry out at least one control function for one or more actuators of said tool.

40. A graphical user interface for carrying out at least one of controlling or monitoring a tool operatively connected to an industrial robot, comprising:
a display of operational data of the tool provided by a wireless controller comprising a wireless communication module operatively connected to the tool and comprising a processor having a communication function module configured to handle wireless communication to and from said tool, and a control unit configured to carry out at least one control function for one or more actuators of said tool, and a supervisory controller physically separate from the industrial robot and configured to wirelessly send signals to the wireless communication module to control operation of the tool, wherein the operational data values displayed are arranged to be displayed upon activation of a part of the graphical representation of the relevant production cell or part thereof using a computer mouse, joystick, touch screen or similar computer display selection element.

* * * * *